United States Patent [19]
Nichols

[11] Patent Number: 5,781,921
[45] Date of Patent: Jul. 14, 1998

[54] METHOD AND APPARATUS TO EFFECT FIRMWARE UPGRADES USING A REMOVABLE MEMORY DEVICE UNDER SOFTWARE CONTROL

[75] Inventor: Robert A. Nichols, Thornton, Colo.

[73] Assignee: Ohmeda Inc., Liberty Corner, N.J.

[21] Appl. No.: 642,993

[22] Filed: May 6, 1996

[51] Int. Cl.$^6$ .................................................. G06F 12/02
[52] U.S. Cl. .................................................. 711/115
[58] Field of Search .......................... 395/430, 442; 711/103, 115

[56] References Cited

U.S. PATENT DOCUMENTS

| | | | |
|---|---|---|---|
| 4,752,871 | 6/1988 | Sparks et al. | 365/185.11 |
| 4,980,859 | 12/1990 | Guterman et al. | 365/185.08 |
| 5,125,075 | 6/1992 | Goodale et al. | 395/200.16 |
| 5,200,959 | 4/1993 | Gross et al. | 371/21.6 |
| 5,303,198 | 4/1994 | Adachi et al. | 365/185.11 |
| 5,386,539 | 1/1995 | Nishi | 395/425 |
| 5,487,161 | 1/1996 | Koenck et al. | 395/442 |
| 5,504,801 | 4/1996 | Moser et al. | 379/29 |
| 5,596,738 | 1/1997 | Pope | 395/430 |

*Primary Examiner*—Tod R. Swann
*Assistant Examiner*—Felix B. Lee
*Attorney, Agent, or Firm*—Roger M. Rathbun; William A. Schoneman

[57] ABSTRACT

The system of the preferred embodiment of the invention contains a processor as well as a permanently mounted programmable FLASH memory in which the firmware resides. The system makes use of a socket in which a memory device can be installed. The socket accepts a firmware update memory device which has stored thereon the firmware revisions or replacement firmware. Once the firmware update memory device is installed, the processor downloads the instructions contained therein to the permanent FLASH memory device. Once the program is transferred to the permanent memory, the system operation is not dependent on the reliability of the socket. In addition, program changes can be input to the system without requiring that the system be equipped with a data input/output device, such as a modem, floppy disk drive or the like.

17 Claims, 2 Drawing Sheets

METHOD AND APPARATUS TO EFFECT FIRMWARE UPGRADES USING A REMOVABLE MEMORY DEVICE UNDER SOFTWARE CONTROL

FIELD OF THE INVENTION

This invention relates to processor based systems which operate pursuant to program instructions that are stored in firmware, and in particular, to a method and apparatus for enabling a user to simply update the firmware that is resident in the processor based system.

BACKGROUND OF THE INVENTION

It is a problem in processor based systems to maintain the most up-to-date firmware which is used to regulate the operation of the processor based system. This is particularly a problem in the field of specialized processor based systems, such as monitoring instruments. In particular, a general purpose processor is designed to operate with numerous commercially available programs and therefore is equipped with a device, such as a floppy disk drive, for inputting software and software updates to the hard drive, to thereby enable the general purpose processor to perform the desired tasks. In contrast, single function processor based systems, such as monitoring and test instruments, are designed to repetitively perform a single set of assigned tasks and are not designed to have the capability of being programmed to perform other functions. Therefore, it is typically not economical to include a software inputting capability, such as a floppy disk drive, in such instrumentation because its use would be sporadic at best.

Therefore, in the field of special purpose processor systems, the firmware which regulates the operation of the system is typically upgraded only infrequently and at those times requires a significant investment in time and energy to input the revised firmware into the system. In many cases, the system must be removed from service, the firmware removed from the system by physically excising the memory devices on which the firmware is written. These devices are typically read-only memory (ROM), programmable read-only memory (PROM), or programmed logic arrays (PLA). In each of these situations, the system is out of service while a technician physically removes the required devices and then installs replacement devices which are programmed with the upgraded or new set of firmware. This procedure is expensive and therefore is infrequently utilized, except in the case where a significant change in the firmware justifies the expenditure to perform the firmware upgrade. In addition, the reliability of the system can be compromised by the selection of the method of installing the memory devices. In particular, if the memory devices are soldered in place, the worker must unsolder the memory device, install a new memory device in its place and solder the new memory device to the printed circuit board. The process of soldering and unsoldering is fairly invasive and can cause damage to the memory devices or the printed circuit board. The alternative of using a plugable socket for the permanent memory also causes a reliability problem since the socket is less reliable than the soldered memory, but does have the advantage of facilitating the exchange of memory devices. There have been a number of attempted solutions to the memory update problem.

One such memory update system is disclosed in U.S. Pat. No. 4,752,871 which has a program register for controlling two permanently mounted EEPROM arrays. The two EEPROM devices comprise independently erasable elements which may be programmed, erased and read independent of each other. Each device has its own data, control and address buses. Thus, one EEPROM device can be programmed while the other device is being read by the processor. The data input to the system is by modem or other interface device connected to the processor. Thus, the processor can concurrently download data into one memory device while also reading data from the other memory device on a multitask basis.

U.S. Pat. No. 4,980,859 discloses a nonvolatile semiconductor random access memory cell which uses a static RAM element and a nonvolatile memory element having differential charge storage capability. The static RAM and non-volatile memory elements are interconnected to allow information to be exchanged between the two memory elements. This configuration enables the faster static RAM to serve as the primary memory for the processor while the slower non-volatile memory element serves as the permanent memory during power down conditions. Thus, the two permanently mounted memory elements store redundant data and the static RAM simply acts as a fast buffer memory.

U.S. Pat. No. 5,303,198 discloses a method of managing an EEPROM memory card. This system includes at least two collective erasure type of EEPROM devices, one of which is managed as a spare memory. When data is to be written into the EEPROM memory, overwriting some of the data stored therein, the data in all memory locations which are not to be overwritten are copied into the spare memory device. The processor then switches the status of the EEPROM devices so that the former spare memory is designated as the main memory device and it contains valid data along with voids at the locations where new or update data is to be written. The previously main memory device is designated as the spare memory device and is erased in total. The data writing process then writes the data into the new main memory device (into the voids) and does not disturb the remaining data. The spare memory device is devoid of data and is available for use by the processor as spare memory. Both of these memory devices are permanently mounted in the system and data is input via a modem, floppy disk drive or other input/output device.

The problem with these memory management systems is that they all use permanently mounted memory devices and require the provision of a modem, floppy disk drive or other input/output device to download data into the memory. Once the data is available to the processor, the above-noted systems all have their unique method of writing the data into the permanently mounted memory device while minimizing the disruption to the operation of the processor. However, none of these solutions are operable absent the provision of a data input/output device, which device may not be an economically viable solution to the memory update problem.

SUMMARY OF THE INVENTION

The above described problems are solved and a technical advance achieved in the field by the method and apparatus for reliably performing firmware upgrades of the present invention. In particular, the preferred embodiment of the invention discloses a single purpose processor based system, such as a monitoring instrument, which contains a processor as well as a permanently mounted programmable FLASH memory in which the firmware resides. The processor operates under control of the firmware resident in the programmable FLASH memory to collect data and process the collected data to perform the measurements for which the monitoring instrument was designed. The data collection and computation steps typically utilize random access memory and/or the FLASH memory as a workspace for the processor.

In order to facilitate upgrading or replacing the firmware that resides on the programmable FLASH memory, the system of the preferred embodiment of the invention makes use of a socket in which a memory device can be installed. The socket accepts a firmware update memory device, which can be an EEPROM device, an EPROM device, a ROM device, a FLASH device, or other such commercially available class of readable memory devices. The firmware update memory device has stored thereon the firmware revisions or replacement firmware which is to be downloaded to the permanent FLASH memory device. Once the firmware update memory device is installed, the processor downloads the instructions contained therein to the permanent FLASH memory device resident in the system. This enables firmware updates without having the system operation dependent on the reliability of the socket into which the firmware update memory device is installed. In addition, the processor can write memory update confirmation information into the firmware update memory device so that when this device is removed from the socket, it can be returned to the manufacturer and the newly input data read therefrom for administrative purposes.

DETAILED DESCRIPTION

Figure 1:
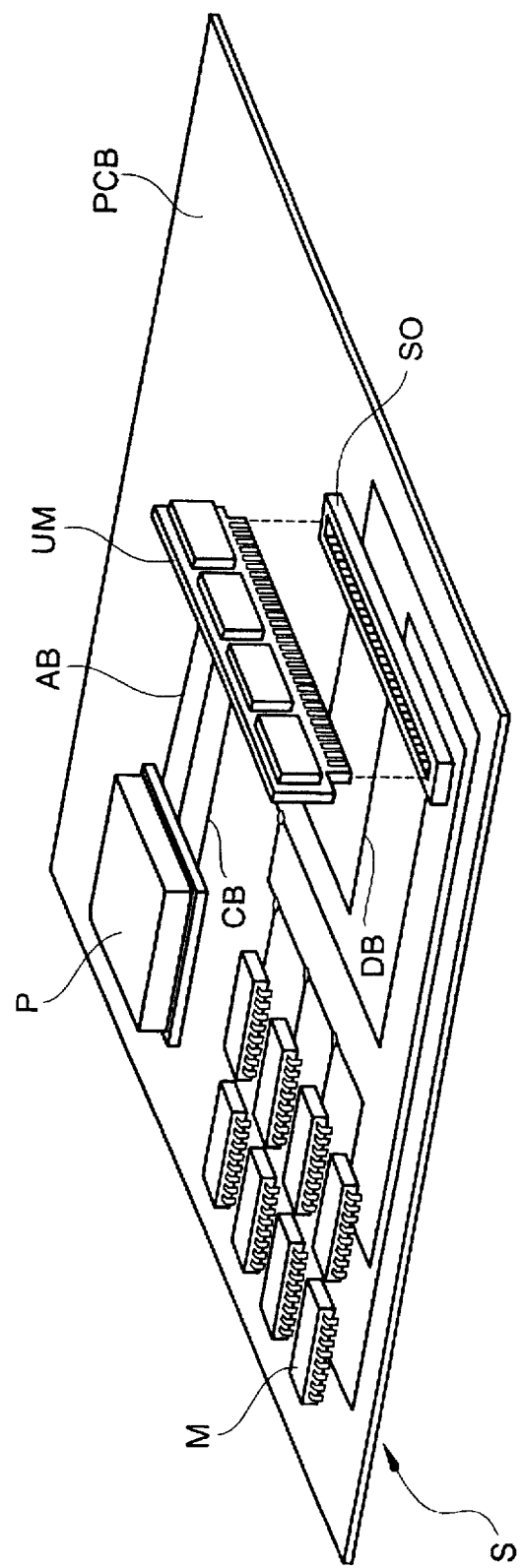
FIG. 1 illustrates in block diagram form the overall architecture of the system of the preferred embodiment of the present invention.

FIG. 1 illustrates, in block diagram form, the preferred embodiment of the present invention. This figure discloses a single purpose processor based system S, such as a monitoring instrument, which contains a processor P as well as a permanently mounted programmable memory M in which the firmware resides. The system S is shown as not being equipped with any data input device, such as a modem or floppy disk drive, although this configuration is not necessary for the purpose of this invention. The programmable memory M is shown as permanently mounted in the system S, typically being soldered to a printed circuit board PCB contained in the system S. The permanent mounting of the programmable memory M is a desirable configuration but not necessary for the purpose of the invention. The programmable memory M is any of the class of programmable memory devices which are capable of storing data for the reading therefrom by the processor P. For the purpose of this description, the programmable memory device M is described as a FLASH memory device, although other equivalent devices can be utilized in place of a FLASH memory device. The processor P operates under control of the firmware resident in the programmable FLASH memory M to collect data and process the collected data to perform the measurements for which the monitoring instrument was designed. The data collection and computation steps typically utilize random access memory and/or the FLASH memory M as a workspace for the processor P.

FIRMWARE UPDATE APPARATUS

In order to facilitate upgrading or replacing the firmware that resides on the programmable FLASH memory M, the system of the preferred embodiment of the invention makes use of a socket SO in which a memory device can be installed. The socket SO accepts a firmware update memory device UM, which can be an electrically erasable programmable read only memory (EEPROM) device, an erasable programmable read only memory (EPROM) device, a read only memory (ROM) device, a FLASH memory device, or other such commercially available class of readable memory devices. The firmware update memory device UM has stored thereon the firmware revisions or replacement firmware which is to be downloaded to the permanent FLASH memory device M. The benefit of such a configuration is that firmware updates can be entered into system memory M without having the system operation dependent on the reliability of the socket SO into which the firmware update memory device UM is installed. In addition, the processor P can write memory update confirmation information into the firmware update memory device UM so that when this device is removed from the socket SO, it can be returned to the manufacturer and the newly input data read therefrom for administrative purposes.

The system S is typically equipped with data DB, control CB, and address buses AB, which function to interconnect the processor P with the permanent memory M, and the socket SO into which the firmware update memory device UM can be inserted. The bus configuration and necessary hardware associated with this architecture are well known in the art and are not described in any detail herein. In addition, the processor P may operate under control of firmware which enables the processor to ascertain whether a firmware update memory device UM has been inserted into socket SO. Absent this capability, the user can indicate the presence of the firmware update memory device UM in socket SO via the activation of appropriate control devices on a user control panel (not shown) or other user input device, such as a keyboard, (not shown) which is typically provided in system S.

SYSTEM OPERATION

Figure 2:
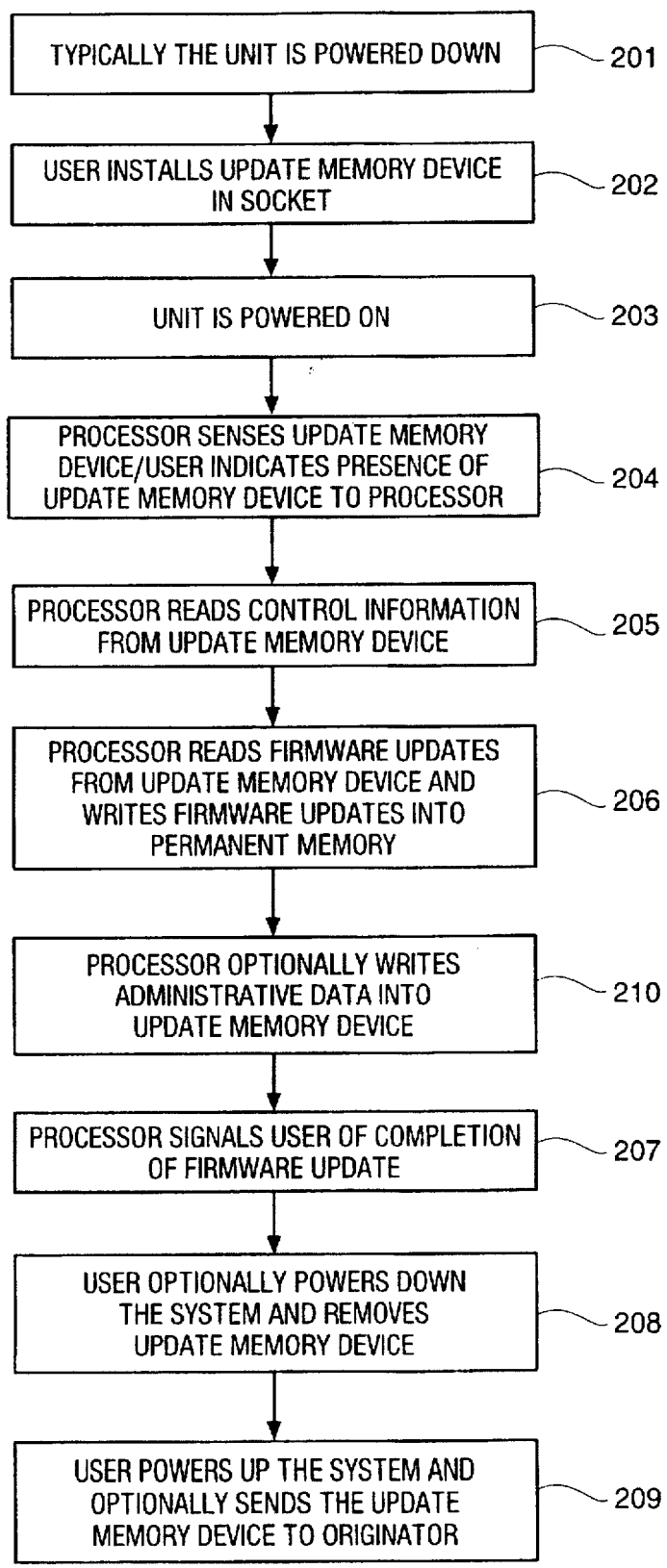
FIG. 2 illustrates in flow diagram form the operational steps used by the system of the preferred embodiment of the invention to perform the firmware upgrade function.

FIG. 2 illustrates in flow diagram form, the operational steps performed by the user and the system S to download firmware updates using the apparatus and method of the present invention. At step 201, the user powers down the system S and then at step 202 the user installs the firmware update memory device UM in socket SO in the system S. The user, at step 203, powers up system S and, at step 204, activates the system S via a user input device, such as a keyboard device, or the processor P detects the presence of the firmware update memory device UM in socket SO. The processor P reads, at step 205, control information from the firmware update memory device UM, which control information defines the nature and extent of the firmware updates contained on the firmware update memory device UM. In response to the read control information, the processor P, at step 206, reads data from the firmware update memory device UM and writes the data into the permanent memory M of the system S, programmable FLASH memory device. These data reads and writes can constitute a complete rewriting of the permanent memory M or can be additions to the firmware contained therein or can be selected changes to the firmware contained therein. Once the processor P completes the transfer/copy of the data from the firmware update memory device UM to the permanent memory M, the processor P signals the user at step 207 via a human sensable indication that the memory update process has been completed. The indication can be an audible tone, visual indication or the like.

The user can then optionally, at step 208, power down the system S and remove the firmware update memory device UM from the socket SO, since its job has been completed. The user can then, at step 209, power up system S and optionally return the firmware update memory device UM to the firmware originator to confirm that the firmware update has been completed.

In addition, the processor P can, at an optional intervening step 210, write data into the firmware update memory device UM to identify the system S into which the firmware update was installed, the date of installation and any other administrative information which the system S is programmed to write in firmware update memory device UM. Thus, when the user transmits the firmware update memory device UM back to its originator, the firmware update memory device UM is self identifying and confirms the execution of the firmware update.

SUMMARY

The problem with existing memory management systems is that they all use permanently mounted memory devices and require the provision of a modem, floppy disk drive or other input/output device to download data into the memory. Single function processor based systems, such as monitoring and test instruments, are designed to repetitively perform a single set of assigned tasks and do not have the capability of being programmed to perform other functions. Therefore, it is typically not economical to include a software inputting capability, such as a floppy disk drive, in such instrumentation because its use would be sporadic at best. The system of the present invention overcomes the limitations of existing system by making use of a socket in which a memory device can be installed. The socket accepts a firmware update memory device which has stored thereon the firmware revisions or replacement firmware. Once the firmware update memory device is installed, the processor downloads the instructions contained therein to the permanent FLASH memory device resident in the system. Once the program is transferred to the permanent memory, the system operation is not dependent on the reliability of the socket. In addition, program changes can be input to the system without requiring that the system be equipped with a data input/output device, such as a modem, floppy disk drive or the like.

I claim:

1. A memory update apparatus for use in a processor based system which is equipped with a processor and a permanently mounted programmable memory device, comprising:

means for receiving a readable memory device, which contains firmware update data;

means for software detection of a readable memory device being installed in said receiving means; and means, responsive to a readable memory device which contains firmware update data being installed in said receiving means, for downloading said firmware update data from said readable memory device into said permanently mounted programmable memory device.

2. The apparatus of claim 1 wherein said means for receiving comprises a socket for plugably receiving a memory device.

3. The apparatus of claim 1 wherein said means for downloading comprises:

means for interconnecting said means for receiving a readable memory device and said permanently mounted programmable memory device for the exchange of data therebetween.

4. The apparatus of claim 3 wherein said means for downloading further comprises:

means, responsive to said software detection means, for reading control information from said readable memory device installed in said receiving means.

5. The apparatus of claim 4 wherein said means for downloading further comprises:

means, responsive to said control information, for transmitting said firmware update data from said readable memory device into said permanently mounted programmable memory device via said interconnecting means.

6. The apparatus of claim 3 wherein said means for software detection further comprises:

means for receiving data input by a user indicating that a readable memory device is installed in said receiving means.

7. The apparatus of claim 6 wherein said means for downloading further comprises:

means, responsive to said user input receiving means, for reading control information from said readable memory device installed in said receiving means.

8. The apparatus of claim 7 wherein said means for downloading further comprises:

means, responsive to said control information, for transmitting said firmware update data from said readable memory device into said permanently mounted programmable memory device via said interconnecting means.

9. The apparatus of claim 1 further comprising:

means for writing memory upgrade confirmation data into said readable memory device.

10. A method for inputting memory updates into a programmable memory, for use in a processor based system which is equipped with a processor and a permanently mounted programmable memory device, comprising the steps of:

receiving a readable memory device, which contains firmware update data, in a memory device socket;

detecting through software the presence of said readable memory device in said memory device socket; and downloading said firmware update data from said readable memory device into said permanently mounted programmable memory device.

11. The method of claim 10 wherein said step of downloading comprises:

interconnecting said memory device socket and said permanently mounted programmable memory device for the exchange of data therebetween.

12. The method of claim 11 wherein said step of downloading further comprises:

reading, in response to said step of detecting the presence of said readable memory device, control information from said readable memory device installed in said memory device socket.

13. The method of claim 12 wherein said step of downloading further comprises:

transmitting, in response to said control information, said firmware update data from said readable memory device into said permanently mounted programmable memory device.

14. The method of claim 11 wherein said step of downloading further comprises:

receiving data input by a user indicative that a readable memory device is installed in said memory device socket.

15. The method of claim 14 wherein said step of downloading further comprises:

reading, in response to said step of receiving, control information from said readable memory device installed in said memory device socket.

16. The method of claim 15 wherein said step of downloading further comprises:

transmitting, in response to said control information, said firmware update data from said readable memory device into said permanently mounted programmable memory device.

17. The apparatus of claim 10 further comprising:

means for writing memory upgrade confirmation data into said readable memory device.

\* \* \* \* \*